(12) United States Patent
Miyashita et al.

(10) Patent No.: US 7,183,684 B2
(45) Date of Patent: Feb. 27, 2007

(54) PERMANENT MAGNET ROTARY MOTOR

(75) Inventors: Toshihito Miyashita, Nagano (JP); Satoru Onodera, Nagano (JP)

(73) Assignee: Sanyo Denki Co., Ltd., Tokyo (JP)

( * ) Notice: Subject to any disclaimer, the term of this patent is extended or adjusted under 35 U.S.C. 154(b) by 108 days.

(21) Appl. No.: 11/131,014

(22) Filed: May 17, 2005

(65) Prior Publication Data

US 2005/0258698 A1    Nov. 24, 2005

(30) Foreign Application Priority Data

May 18, 2004  (JP) ............................. 2004-147986

(51) Int. Cl.
*H02K 21/16* (2006.01)
*H02K 1/27* (2006.01)
*H02K 1/22* (2006.01)
*H02K 21/14* (2006.01)

(52) U.S. Cl. ............................. 310/156.38; 310/156.46

(58) Field of Classification Search ........... 310/156.01, 310/156.38, 156.39, 156.44, 156.45, 156.46, 310/156.74

See application file for complete search history.

(56) References Cited

U.S. PATENT DOCUMENTS

| 5,936,322 A | 8/1999 | Yamaguchi et al. |
| 6,329,728 B1 | 12/2001 | Kitazawa et al. |
| 6,597,078 B2 * | 7/2003 | Crapo et al. ........... 310/156.01 |
| 6,703,745 B2 | 3/2004 | Chu |
| 6,858,960 B1 * | 2/2005 | Muszynski ............. 310/156.47 |
| 7,034,423 B2 * | 4/2006 | Crapo et al. ................. 310/152 |
| 2001/0048264 A1 | 12/2001 | Trago et al. |
| 2002/0101126 A1 | 8/2002 | Crapo et al. |
| 2005/0040722 A1 * | 2/2005 | Hartsfield, Jr. ......... 310/156.45 |
| 2006/0049709 A1 * | 3/2006 | Noh ...................... 310/156.38 |
| 2006/0202579 A1 * | 9/2006 | Hahn ..................... 310/156.45 |

FOREIGN PATENT DOCUMENTS

| EP | 1 014 541 A1 | 6/2000 | |
| JP | 63129835 | * 6/1988 | ............ 310/156.38 |
| JP | 11-146584 | 5/1999 | |

* cited by examiner

*Primary Examiner*—Tran Nguyen
(74) *Attorney, Agent, or Firm*—Rankin, Hill, Porter & Clark LLP

(57) ABSTRACT

A permanent magnet rotary motor that can maintain higher torque density and reduce cogging torque more greatly than a conventional permanent magnet rotary motor. A pair of end surfaces of each of permanent magnets used for a rotor are substantially parallel to a virtual plane that extends in the radial direction of a rotor core while passing through the centers of a stator core and an arc surface. Then, the length of the arc surface in the peripheral direction of a rotor core and inclinations of inclined surfaces are so determined that a pole arc ratio $\Psi_1$ of the arc surface and a pole arc ratio $\Psi_2$ of a magnetic pole surface in each permanent magnet satisfy the relation of $P/2N \leq \Psi_2 - \Psi_1 \leq 1.38 \times P/2N$.

13 Claims, 3 Drawing Sheets

PERMANENT MAGNET ROTARY MOTOR

BACKGROUND OF THE INVENTION

The present invention relates to a permanent magnet rotary motor.

Generally, there is known a permanent magnet rotary motor which has armatures to generate a shifting magnetic field at a stator and a plurality of magnetic poles composed of permanent magnets at a rotor, which act with the shifting magnetic field to generate an electromagnetic force. However, in the motor with the permanent magnets as described above, pulsating torque (cogging torque) and a thrust force are produced at the time of no-load operation. Such cogging torque hinders smooth rotation or reciprocation of the motor, thus causing vibration and speed variation of the motor. As an approach to reducing the cogging torque, there have been hitherto proposed formation of a slot with an oblique groove, hereinafter referred to as a skew, in a stator or a rotor, or use of a permanent magnet having the shape of a sector with the center of an inner circular arc thereof not aligned with the center of an outer circular arc thereof, hereinafter referred to as the permanent magnet of an eccentric type. However, formation of the skew may reduce the torque or reduce the productivity of the motor. Further, use of the permanent magnet of the eccentric type cannot increase the magnetic flux density of the motor, so that higher torque. density cannot be achieved.

Then, in order to address these problems, Japanese Patent Application Laid-Open Publication No. 146584/1999 discloses a permanent magnet rotary motor. In this motor, a pair of end surfaces of each of a plurality of permanent magnets that are located on both sides of each permanent magnet in the peripheral direction of a rotor and oppose to each other in the peripheral direction are so formed as to extend in the radial direction of the rotor. The magnetic surface of each permanent magnet is configured to include an arc surface and a pair of inclined surfaces. The arc surface is arranged in the central portion of the magnetic pole surface in the peripheral direction, and the pair of inclined surfaces are located on both sides of the arc surface in the peripheral direction and are inclined in such a manner that a gap between the inclined surface and the magnetic pole surface of the magnetic pole section spread toward the peripheral direction as leaving from the arc surface. The higher torque density and reduction of the cogging torque are thereby effectively achieved.

In the conventional permanent magnet rotary motor described in the Publication No. 146584/1999, by setting an open angle Am of each inclined surface and an open angle As of each magnetic pole section of a stator so that the relation of (1/10) As<Am<(1/4) As is satisfied, the cogging torque is reduced. However, just by using the permanent magnet of a type in which both ends in the peripheral direction of each permanent magnet are inclined, and just by setting the relationship between the open angles Am and As as described above, there was a limitation of reducing the cogging torque though the torque can be maintained to be comparatively high.

SUMMARY OF THE INVENTION

An object of the present invention is therefore to provide a permanent magnet rotary motor that can maintain higher torque density and can also reduce cogging torque more greatly than a conventional permanent magnet rotary motor.

A permanent magnet rotary motor according to the present invention includes a stator and a rotor. The stator includes a stator core having N slots and N magnetic pole sections (N: a natural number of 2 or more) and exciting windings wound on the N magnetic pole sections. Each of the N slots and the N magnetic pole sections is arranged to be spaced at equal intervals in the peripheral direction of the stator. The rotor has a rotor core and P permanent magnets (P: a natural number of 2 or more) provided on the surface of the rotor core or a rotor shaft to be spaced at equal intervals in the peripheral direction of the rotor core or the rotor shaft. The rotor rotates with respect to the stator. These permanent magnets have magnetic pole surfaces opposing to the magnetic pole sections in the radial direction of the rotor core or the rotor shaft. Each of the magnetic pole surfaces of the permanent magnets includes an arc surface and a pair of inclined surfaces. The arc surface is located at a central portion of the magnetic pole surface and is formed so that a gap between the arc surface and the magnetic pole surface of the magnetic pole section is constant. The pair of inclined surfaces are inclined in such a manner that a gap between the inclined surface and the magnetic pole surface of the magnetic pole section spreads toward the peripheral direction as leaving from the arc surface Each of the P permanent magnets has a pair of end surfaces located on both sides of each of the permanent magnets in the peripheral direction of the rotor core or the rotor shaft and opposing to each other in the radial direction of the rotor core or the rotor shaft. The pair of end surfaces are formed to be substantially parallel to a virtual plane that extends in the radial direction while passing through the center of the stator core and the center of the arc surface. In the present invention, the length of the arc surface in the peripheral direction of the rotor core or the rotor shaft and inclinations of the inclined surfaces are so determined that a pole arc ratio $\Psi_1$ of the arc surface of each of the permanent magnets and a pole arc ratio $\Psi_2$ of the magnetic pole surface of each of the permanent magnets satisfy a relation of $P/2N \leq \Psi_2 - \Psi_1 \leq 1.38 \times P/2N$. In this specification, the pole arc ratio $\Psi_1$ is defined to be the value obtained by dividing an open angle $\theta 1$ of the arc surface of a permanent magnet by an angle $2\pi/P$ (being $\theta 1 \div 2\pi/P$, herein). The open angle $\theta 1$ is the angle between one end and the other end of the arc surface in the peripheral direction of the rotor core or the rotor shaft, as illustrated in FIG. 2. The angle $2\pi/P$ is obtained by dividing a full circumference angle $2\pi$ (360°) by the number of the permanent magnets P. Further, the pole arc ratio $\Psi_2$ is defined to be the value obtained by dividing an open angle $\theta 2$ of the magnetic pole surface of the permanent magnet as illustrated in FIG. 2, by the angle $2\pi/P$ (being $\theta 2 \div 2\pi/P$, herein). When the range of $\Psi_2 - \Psi_1$ is defined as in the present invention, cogging torque can be reduced greatly than in a case where a conventional structure is adopted, though torque is reduced a-little.

Preferably, the permanent magnets are magnetized and oriented in parallel to a direction in which the virtual plane extends. With this arrangement, the distribution of magnetic flux density within the gaps becomes closer to a sine wave. Then, by rotation of the rotor, the waveform of an induced voltage generated between winding terminals becomes closer to the sine wave. Thus, torque ripples can be potentially reduced.

When the numbers of the N and the P are so determined as to satisfy an equation of $P/2N=1/3$, the pole arc ratio $\Psi_1$ and the pole arc ratio $\Psi_2$ will satisfy a relation of $1/3 \leq \Psi_2 - \Psi_1 \leq 0.46$. When the present invention is applied to the motor that satisfies the above relationships, the effect of increasing the torque and reducing the cogging torque is particularly great. In this case, when the pole arc ratio $\Psi_1$, and the pole arc ratio $\Psi_2$ are so determined as to satisfy the relation of $0.371 \leq \Psi_2 - \Psi_1 \leq 0.393$, the cogging torque can be more greatly reduced.

An open angle Am of each of the inclined surfaces of the motor according to the present invention is not included in the range of the open angle Am in a prior art disclosed in Japanese Patent Application Laid-Open Publication No. 146584/1999. The reason for this will be described below. When the open angle of each slot is indicated by ws, an open angle As of each magnetic pole section of the stator becomes (360/N)−ws. When the number of the permanent magnets P is set to eight and the number of slots N is set to 12, the open angle ws of each slot is in the range of 0° to 30°. Thus, the open angle As ranges from 30° to 0°. When the range of the open angle Am is determined by using a relation of (1/10)As<Am<(1/4)As between the open angles Am and As in the prior art, the range of the open angle Am is larger than 0° and smaller than 7.5°.

On contrast therewith, when P=8 and N=12 are substituted into the relation of $P/2N \leq \Psi_2 - \Psi_1 \leq 1.38 \times P/2N$, the above-mentioned relation of $1/3 \leq \Psi_2 - \Psi_1 \leq 0.46$ (referred to as Equation 1) is obtained. When the open angle of the arc surface of each permanent magnet is indicated by θ1 and the open angle of the magnetic pole surface of each permanent magnet is indicated by θ2, Am =(1/2)×(θ2−θ1) holds. When this equation is expressed using the pole arc ratios, Am=(1/2)×($\Psi_2 - \Psi_1$)×(360°/P) holds. Thus, $\Psi_2 - \Psi_1$=2×Am×P×(1/360°) is derived. When P=8 is substituted into the above equation, ($\Psi_2 - \Psi_1$)=Am ×(2/45) (referred to as Equation 2) is obtained. When the Equation (2) is substituted into the Equation (1), the open angle Am of the motor of the present invention is in the range of 7.5° to 10.35° (7.5°≦Am≦10.35°). Thus, the open angle Am of the present invention is not included in the range of the open angle Am in the art described in the Publication No. 146584/1999, which is larger than: 0° and smaller than 7.5°.

When each of the inclined surfaces formed in the magnetic pole surface of each permanent magnet is a plane, it is preferable that the angle of each of the inclined surfaces is so determined that the virtual plane, which passes through the center of the stator core and the center of the arc surface, crosses the extended surface of each of the inclined surfaces at an angle of (70°−90°/P) to (80°−90°/P). When this angle is below (70°−90°/P), the torque is reduced. When this angle is over (80°−90°/P), the cogging torque cannot be reduced sufficiently.

Further, it is preferable that each of the magnetic pole surfaces of the permanent magnets is formed to be plane-symmetric with respect to the virtual plane. With this arrangement, the cogging torque can be reduced greatly, with any rotating direction of the rotor.

In a specific permanent magnet rotary motor of the present invention, a stator includes a stator core having 12 slots and 12 magnetic pole sections and exciting windings of three phases wound on the 12 magnetic pole sections. Each of 12 slots and 12 magnetic pole sections is arranged to be spaced at equal intervals in the peripheral direction of the stator. Further, a rotor has a rotor core and eight permanent magnets provided on the surface of the rotor core or a rotor shaft to be spaced at equal intervals in the peripheral direction of the rotor core or the rotor shaft. The permanent magnets have magnetic pole surfaces opposing to the magnetic pole sections of the stator in the radial direction of the rotor core or the rotor shaft, and the rotor rotates with respect to the stator. Each of magnetic surfaces of the 12 magnetic pole sections is formed to be located on a virtual cylindrical surface centering on the center of the stator core. Each of the magnetic pole surfaces of the eight permanent magnets includes an arc surface and a pair of inclined surfaces. The arc surface is arranged in the central portion of each of the magnetic pole surfaces in the peripheral direction of the rotor core or the rotor shaft and is so shaped that the dimension of a gap from the opposing one of the magnetic surfaces of the magnetic pole sections in the radial direction is constant. Further, the pair of inclined surfaces is located on both sides of the arc surface in the peripheral direction of the rotor core or the rotor shaft and has a shape in which the inclined surfaces are inclined in such a manner that a gap between the inclined surface and the magnetic pole surface of the magnetic pole section spread toward a peripheral direction as leaving from the arc surface. Each of the eight permanent magnets has a pair of end surfaces located on both sides thereof in the peripheral direction of the rotor core or the rotor shaft and opposes to each other in the peripheral direction. The pair of end surfaces are formed to be substantially parallel to a virtual plane extending in the radial direction while passing through the center of the stator core and the center of the arc surface. In this case, preferably, the length of the arc surface in the peripheral direction of the rotor core or the rotor shaft and inclinations of the inclined surfaces are so determined that a pole arc ratio $\Psi_1$ of the arc surface of each of the permanent magnets and a pole are ratio $\Psi_2$ of the magnetic pole surface of each of the permanent magnets satisfy a relation of $1/3 \leq \Psi_2 - \Psi_1 \leq 0.46$.

In the permanent magnet rotary motor according to the present invention, the pair of end surfaces of each permanent magnet in the peripheral direction of the rotor core or the rotor shaft is formed to be substantially parallel to the virtual plane that extends in the radial direction of the rotor core or the rotor shaft, passing through the center of the stator core and the center of the arc surface. Thus, the cogging torque can be greatly reduced without greatly reducing the torque.

BRIEF DESCRIPTION OF THE DRAWINGS

These and other objects and many of the attendant advantages of the present invention will be readily appreciated as the same becomes better understood by reference to the following detailed description when considered in connection with the accompanying drawings: wherein.

DETAILED DESCRIPTION OF PREFFERED EMBODIMENT

Figure 1:
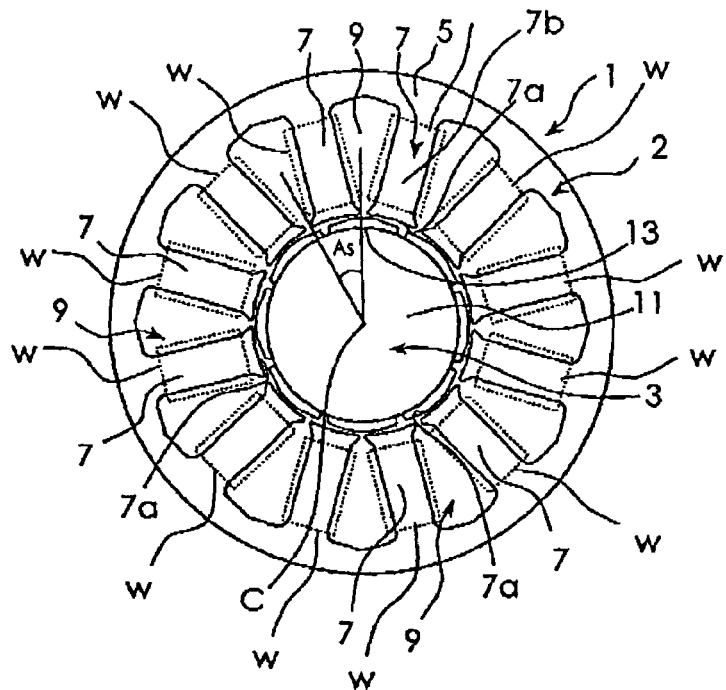
FIG. 1 is a diagram schematically showing a configuration of a stator and a rotor of a permanent magnet rotary motor used for explaining an embodiment of the present invention.
Figure 2:
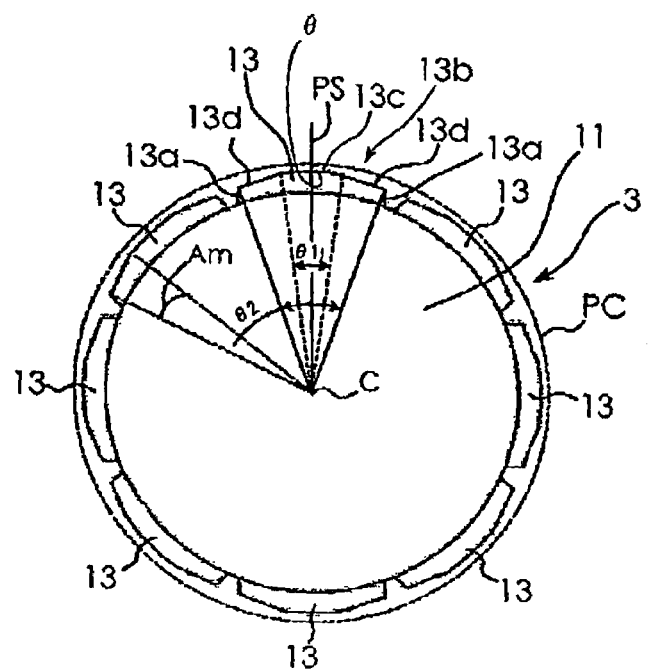
FIG. 2 is a schematic diagram showing an enlarged configuration of the rotor in FIG. 1.

A best mode for carrying out the present invention will be described with reference to the appended drawings. FIG. 1 is a diagram schematically showing a configuration of and a relationship between a stator 1 and a rotor 3 of a permanent magnetic rotary motor used for explaining an embodiment of the present invention. In FIG. 1, for simplicity of illustration, exciting windings for the stator 1 are not illustrated. FIG. 2 is a diagram schematically showing a configuration of the rotor 3 of the permanent magnet rotary motor in FIG.

1. FIG. 2 illustrates a virtual cylindrical surface PC, which will be described later. As shown in FIG. 1, the stator 1 includes a stator core 2 and the exciting windings W. The stator core 2 includes a cylindrical yoke 5 and N (being 12, herein) magnetic pole sections 7 that extend toward a center C of the stator core 2 from the inner periphery of the yoke 5. Each of the 12 magnetic pole sections 7 has a magnetic pole main body section 7b with an exciting winding wound thereon and has a magnetic pole surface 7a at a leading end thereof. The magnetic pole surface 7a of each of the 12 magnetic pole sections 7 is formed to be arranged on the virtual cylindrical surface PC illustrated in FIG. 2, which centers on the center C of the stator core 2. With this arrangement, the stator core 2 has N (being 12, herein) slots 9 arranged between respective adjacent pairs of the magnetic pole sections 7 which are spaced at equal intervals in a peripheral direction of the stator core 2.

As illustrated in FIG. 2, the rotor 3 includes a cylindrical rotor core 11 and P (being eight, herein) permanent magnets 13. The rotor core 11 may comprise the rotor shaft. In addition, the shaft may be provided at a center of the rotor core 11. The permanent magnets 13 are arranged on the surface of the rotor core 11 at equal intervals in the peripheral direction of the rotor core. Each of the permanent magnets 13 has a pair of end surfaces 13a, 13a and a magnetic pole surface 13b. The pair of end surfaces 13a, 13a are arranged on both sides of each permanent magnet 13 in the peripheral direction of the rotor core 11 and oppose to each other in the peripheral direction of the rotor core 11. As will be described later in detail, the magnetic pole surface 13b is composed of an arc surface 13c and a pair of inclined surfaces 13d, 13d. The rotor 3 is so arranged within the stator 1 that the magnetic surfaces 13b of the permanent magnets 13 face the magnetic pole surfaces 7a of the magnetic pole sections 7 of the stator core 2.

Each of the pairs of end surfaces 13a, 13a of the permanent magnets 13 is so formed that the pair of end surfaces 13a, 13a substantially are parallel to a virtual plane PS that passes through the center C of the stator core 2 and the center of the arc surface 13c. The permanent magnets 13 are so magnetized as to be parallel to a direction in which the virtual plane PS extends. The magnetic pole surfaces 13b of the permanent magnets 13 oppose the magnetic pole surfaces 7a of the magnetic pole sections 7 of the stator core 2 in the radial direction of the rotor core 11. The arc surface 13c and the pair of inclined surfaces 13d, 13d that constitute the magnetic pole surface 13b are formed to be plane-symmetric with respect to the virtual plane PS that passes through the center of the arc surface 13c. The arc surface 13c is located in the central portion of the magnetic pole surface 13b in the peripheral direction of the rotor core 11. The dimension of a gap between each of the magnetic pole surfaces 7a of the magnetic pole sections 7 of the stator core 2 and the opposing arc surface 13c in the radial direction is constant. The pair of inclined surfaces 13d, 13d are located on both sides of the arc surface 13c in the peripheral direction of the rotor core 11, and are inclined in such a manner that a gap between each of the inclined surface 13d, 13d and the magnetic pole surface 7a of the magnetic pole section 7 of the stator core 2 spreads toward a peripheral direction as leaving from the arc surface 13c. In other words, the pair of inclined surfaces 13d, 13d are inclined in such a manner that a gap between the inclined surface 13d, 13d and the magnetic pole surface 7a of the magnetic pole section 7 spreads toward the peripheral direction as leaving from the virtual plane PS. In this embodiment, the pair of inclined surfaces 13d, 13d are composed of the planes which are inclined linearly or the planes inclined at a constant angle. An angle θ formed between the virtual plane PS and a virtual inclined surface, which is an extended surface of the inclined surface 13d in this embodiment is set to 63°. Preferably, this angle is in the range of (70°–90°/P) to (80°–90°/P). Accordingly, in this embodiment, it is preferable that this angle is in the range of 58.75° to 68.75°.

In the present invention, the length of the arc surface 13c of a permanent magnet 13 in the peripheral direction of the rotor core 11 and inclinations of the inclined surfaces 13d, 13d are so determined that a pole arc ratio $\Psi_1$ of the arc surface 13c of the permanent magnet 13 and a pole arc ratio $\Psi_2$ of the magnetic pole surface 13b of the permanent magnet 13 satisfy the relation of $P/2N \leq \Psi_2 - \Psi_1 \leq 1.38 \times P/2N$. Herein, the pole arc ratio $\Psi_1$ is so defined as to be the value (being θ1/45, herein) obtained by dividing an open angle θ1 of the arc surface 13c of each permanent magnet 13 by an angle 2π/P (being 45°, herein). The angle 2π/P (being 45°, herein) is obtained by dividing a full circumference angle 2π (360°) by the number of the permanent magnets (being eight, herein). Further, the pole arc ratio $\Psi_2$ is so defined as to be the value (being θ2/45, herein) obtained by dividing an open angle θ2 of the magnetic pole surface 13b of each permanent magnet 13 by the angle 2π/P (being 45°, herein).

Figure 3:
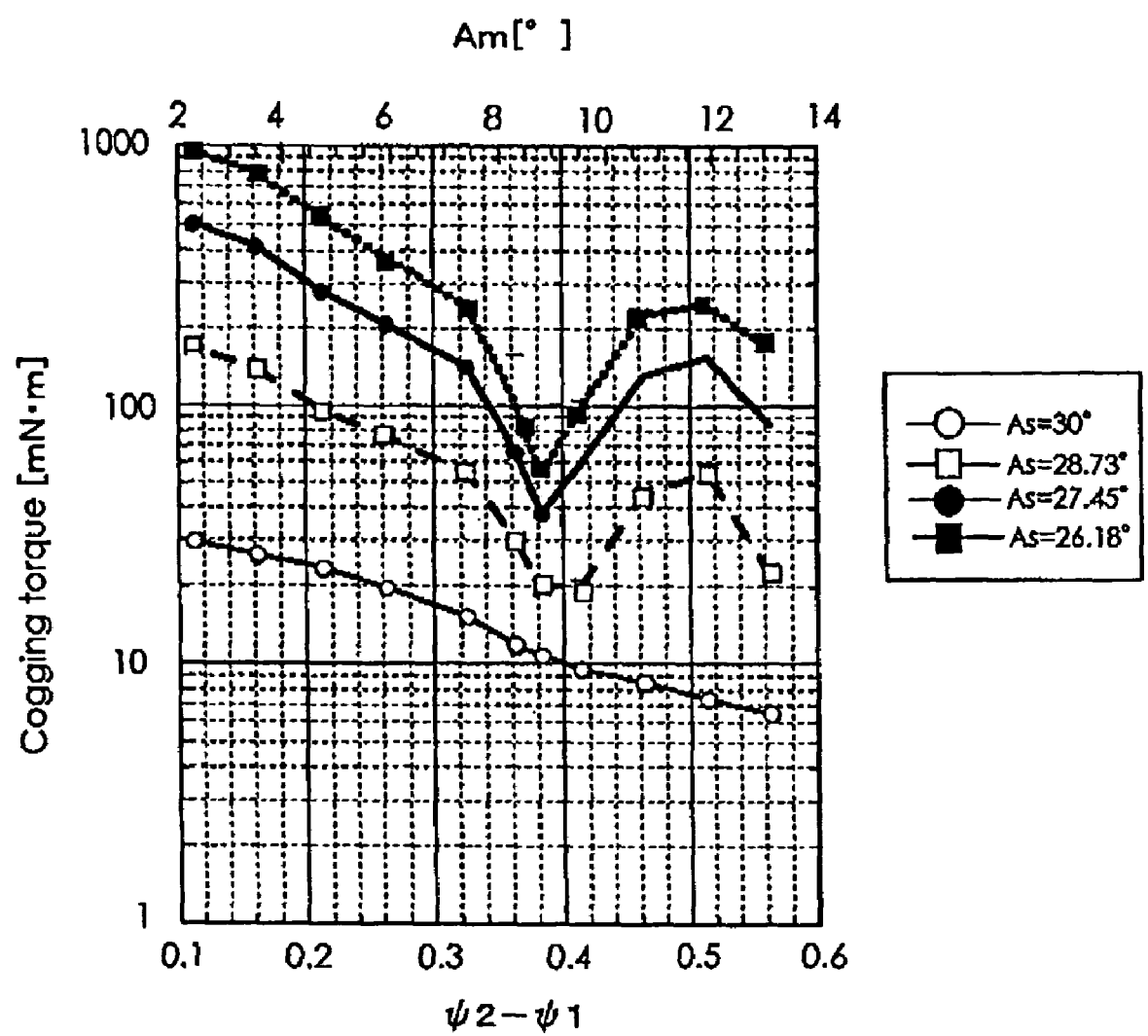
FIG. 3 is a graph showing relationships between ($\Psi_2 - \Psi_1$) and cogging torque in motors used for tests.

Next, motors each having a different open angle As of the magnetic pole surface 7a of the magnetic pole section 7 of the stator 1 were fabricated, and the relationship between $(\Psi_2 - \Psi_1)$ and cogging torque of each of the motors was studied. The open angle As is illustrated in FIG. 1, and FIG. 3 shows the results of measurement. Referring to FIG. 3, the motor having the open angle As of 30° is the one having no openings of the slots 9. It can be seen from FIG. 3 that in the motors having the open angles As smaller than 30°, when the $(\Psi_2 - \Psi_1)$ is in the range of P/2N to 1.38×P/2N, or in the range of 1/3(0.333) to 0.46, wherein the P is eight, and the N is 12, the cogging torque is reduced. It can be seen, in particular, that the cogging torque is greatly reduced when the $(\Psi_2 - \Psi_1)$ is in the range of 0.371 to 0.393. Incidentally, in view of an open angle Am of the inclined surface 13c illustrated in FIG. 2, it can be seen that the cogging torque is reduced when the open angle Am is in the range of 7.5° to 10.35°. It can be further seen that the cogging torque is greatly reduced in the vicinity of the open angle Am of 8.595°. As described above, when the P is set to 8 and the N is set to 12, the open angles Am of the motors according to the present invention are not included in the range of the open angle Am of a conventional motor, which is larger than 0° and smaller than 7.5°.

Figure 4:
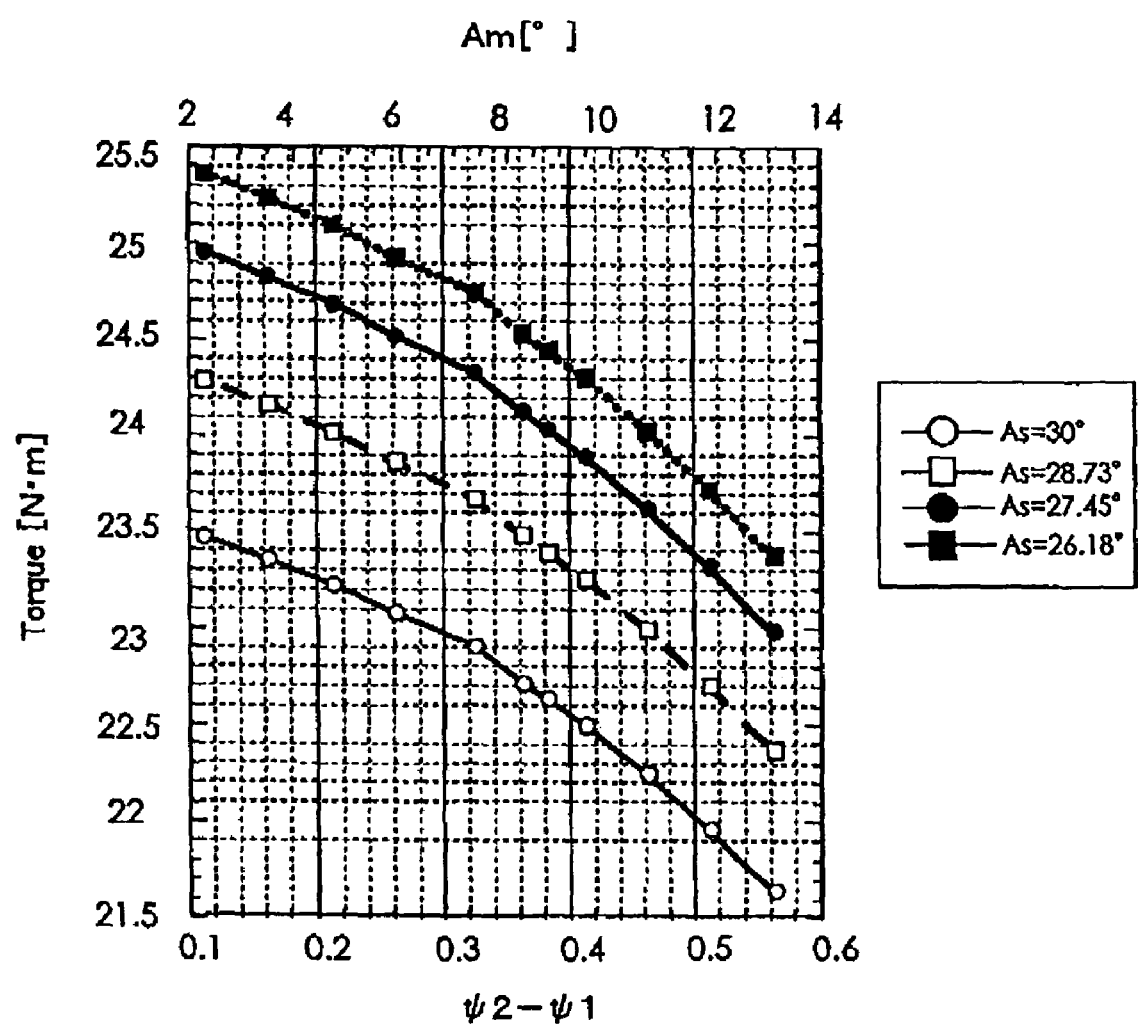
FIG. 4 is a graph showing relationships between the ($\Psi_2 - \Psi_1$) and torque in the motors used for the tests.

FIG. 4 shows the relationship between the $(\Psi_2 - \Psi_1)$ and torque in each of the motors used in FIG. 3. As seen from FIG. 4, the torque is reduced as the $(\Psi_2 - \Psi_1)$ is increased. However, it can be seen that, when the $(\Psi_2 - \Psi_1)$ is in the range of 1/3 (0.333) to 0.46, particularly in the range of 0.371 to 0.393, the torque is not so greatly reduced. Accordingly, according to this embodiment, the cogging torque can be reduced more greatly than in the prior art, without reducing the torque greatly.

In the embodiment described above, the number of the magnetic pole sections of the stator is set to 12, while the number of the permanent magnets of the rotor is set to eight. The present invention, however, is not limited to this combination.

While the preferred embodiment of the invention has been described with a certain degree of particularity with reference to the drawings, obvious modifications and variations are possible in light of the above teachings. It is therefore to be understood that within the scope of the appended claims, the invention may be practiced otherwise than as specifically described.

What is claimed is:

1. A permanent magnet rotary motor comprising:
a stator including a stator core having N slots and N magnetic pole sections (N: a natural number of 2 or more) and exciting windings wound on said N magnetic pole sections, each of said N slots and said N magnetic pole sections being arranged to be spaced at equal intervals in a peripheral direction thereof; and
a rotor having a rotor core and P permanent magnets (P: a natural number of 2 or more), said rotor rotating with respect to said stator, said P permanent magnets being provided on a surface of said rotor core or a rotor shaft to be spaced at equal intervals in a peripheral direction of said rotor core or said rotor shaft, said P permanent magnets having magnetic pole surfaces opposing to said magnetic pole sections in a radial direction of said rotor core or said rotor shaft;
each of magnetic pole surfaces of said N magnetic pole sections being so formed as to be located on a virtual cylindrical surface centering on a center of said stator core; and
each of said magnetic pole surfaces of said permanent magnets comprising an arc surface and a pair of inclined surfaces located on both sides of the arc surface in the peripheral direction of said rotor core, the arc surface being located at a central portion of the magnetic pole surface and being formed so that a gap between the arc surface and the magnetic pole surface of the magnetic pole section is constant, the pair of inclined surfaces being inclined in such a manner that a gap between the inclined surface and the magnetic pole surface of the magnetic pole section spreads toward the peripheral direction as leaving from the arc surface; wherein
a pair of end surfaces of each of said permanent magnets, located on both sides of each of said permanent magnets in the peripheral direction of said rotor core or said rotor shaft and opposing to each other in the peripheral direction, are so formed as to be substantially parallel to a virtual plane, said virtual plane extending in the radial direction while passing through said center of said stator core and a center of the arc surface; and
a length of the arc surface in the peripheral direction of said rotor core or said rotor shaft and inclinations of the inclined surfaces are so determined that a pole arc ratio $\Psi_1$ of the arc surface of each of said permanent magnets and a pole arc ratio $\Psi_2$ of the magnetic pole surface of said each of said permanent magnets satisfy a relation of $P/2N \leq \Psi_2 - \Psi_1 \leq 1.38 \times P/2N$.

2. The permanent magnet rotary motor according to claim 1, wherein said permanent magnets are magnetized and oriented in parallel to a direction in which said virtual plane extends.

3. The permanent magnet rotary motor according to claim 1, wherein numbers of the N and the P are so determined that the pole arc ratio $\Psi_1$ and the pole arc ratio $\Psi_2$ satisfy a relation of $1/3 \leq \Psi_2 - \Psi_1 \leq 0.46$.

4. The permanent magnet rotary motor according to claim 1, wherein the pole arc ratio $\Psi_1$ and the pole arc ratio $\Psi_2$ are so determined that the pole arc ratio $\Psi_1$ and the pole arc ratio $\Psi_2$ satisfy a relation of $0.371 \leq \Psi_2 - \Psi_1 \leq 0.393$.

5. The permanent magnet rotary motor according to claim 1, wherein each of the inclined surfaces is a plane.

6. The permanent magnet rotary motor according to claim 5, wherein said virtual plane crosses a virtual inclined surface at an angle of $(70°-90°/P)$ to $(80°-90°/P)$, said virtual inclined surface including the inclined surfaces therein.

7. The permanent magnet rotary motor according to claim 1, wherein said magnetic pole surface of said permanent magnet is formed to be plane-symmetric with respect to said virtual plane.

8. A permanent magnet rotary motor comprising:
a stator including a stator core having 12 slots and 12 magnetic pole sections and exciting windings of three phases wound on said 12 magnetic pole sections, each of said N slots and said N magnetic pole section being arranged to be spaced at equal intervals in a peripheral direction thereof; and
a rotor having a rotor core and eight permanent magnets, said rotor rotating with respect to said stator, said permanent magnets being provided on a surface of said rotor core or a rotor shaft to be spaced at equal intervals in a peripheral direction of said rotor core or said rotor shaft, said permanent magnets having magnetic pole surfaces opposing to said magnetic pole sections in a radial direction of said rotor core or said rotor shaft;
each of magnetic surfaces of said 12 magnetic pole sections being so formed as to be located on a virtual cylindrical surface centering on a center of said stator core;
each of said magnetic pole surfaces of said eight permanent magnets comprising an arc surface and a pair of inclined surfaces located on both sides of the arc surface in the peripheral direction of said rotor core, the arc surface being located at a central portion of the magnetic pole surface and being formed so that a gap between the arc surface and the magnetic pole surface of the magnetic pole section is constant, the pair of inclined surfaces being inclined in such a manner that a gap between the inclined surface and the magnetic pole surface of the magnetic pole section spreads toward the peripheral direction as leaving from the arc surface; and
each of said eight permanent magnets including a pair of end surfaces which are located on both sides of said each of said permanent magnets in the peripheral direction of said rotor core or said rotor shaft and which oppose to each other in the peripheral direction; wherein
the pair of end surfaces of said permanent magnet are so formed as to be substantially parallel to a virtual plane, said virtual plane extending in the radial direction while passing through said center of said stator core and a center of the arc surface; and
a length of the arc surface in the peripheral direction of said rotor or said rotor shaft and inclinations of the inclined surfaces are so determined that a pole arc ratio $\Psi_1$ of the arc surface of said each of said permanent magnets and a pole arc ratio $\Psi_2$ of the magnetic pole surface of said each of said permanent magnets satisfy a relation of $1/3 \leq \Psi_2 - \Psi_1 \leq 0.46$.

9. The permanent magnet rotary motor according to claim 2, wherein numbers of the N and the P are so determined that the pole arc ratio $\Psi_1$ and the pole arc ratio $\Psi_2$ satisfy a relation of $1/3 \leq \Psi_2 - \Psi_1 \leq 0.46$.

10. The permanent magnet rotary motor according to claim 2, wherein the pole arc ratio $\Psi_1$ and the pole arc ratio $\Psi_2$ are so determined that the pole arc ratio $\Psi_1$ and the pole arc ratio $\Psi_2$ satisfy a relation of $0.371 \leq \Psi_2 - \Psi_1 \leq 0.393$.

11. The permanent magnet rotary motor according to claim 2, wherein said magnetic pole surface of said perma nent magnet is formed to be plane-symmetric with respect to said virtual plane.

12. The permanent magnet rotary motor according to claim 5, wherein said magnetic pole surface of said permanent magnet is formed to be plane-symmetric with respect to said virtual plane.

13. The permanent magnet rotary motor according to claim 6, wherein said magnetic pole surface of said permanent magnet is formed to be plane-symmetric with respect to said virtual plane.

* * * * *